(12) United States Patent
Ravdel et al.

(10) Patent No.: US 9,548,497 B2
(45) Date of Patent: Jan. 17, 2017

(54) LAYERED COMPOSITE CURRENT COLLECTOR WITH PLURALITY OF OPENINGS, METHODS OF MANUFACTURE THEREOF, AND ARTICLES INCLUDING THE SAME

(75) Inventors: Boris Ravdel, Voluntown, CT (US); Frank Puglia, Richmond, RI (US)

(73) Assignee: EaglePicher Technologies, LLC, Joplin, MO (US)

( * ) Notice: Subject to any disclaimer, the term of this patent is extended or adjusted under 35 U.S.C. 154(b) by 1162 days.

(21) Appl. No.: 13/157,981

(22) Filed: Jun. 10, 2011

(65) Prior Publication Data

US 2012/0315537 A1 Dec. 13, 2012

(51) Int. Cl.
| | |
|---|---|
| *H01M 4/13* | (2010.01) |
| *H01M 4/139* | (2010.01) |
| *H01M 4/74* | (2006.01) |
| *H01M 4/66* | (2006.01) |

(52) U.S. Cl.
CPC .............. *H01M 4/667* (2013.01); *H01M 4/668* (2013.01); *H01M 4/742* (2013.01); *Y10T 29/49108* (2015.01); *Y10T 29/49115* (2015.01)

(58) Field of Classification Search
CPC ......... H01M 4/665; H01M 4/667; H01M 8/20
USPC ................................................ 429/233, 161
See application file for complete search history.

(56) References Cited

U.S. PATENT DOCUMENTS

| | | | |
|---|---|---|---|
| 4,687,717 A | 8/1987 | Kaun et al. | |
| 4,816,359 A | 3/1989 | Nagele et al. | |
| 5,162,178 A | 11/1992 | Ohsawa et al. | |
| 5,521,028 A | 5/1996 | Gauthier et al. | |
| 5,587,253 A | 12/1996 | Gozdz et al. | |
| 6,143,444 A | 11/2000 | Roh | |
| 6,447,957 B1 * | 9/2002 | Sakamoto et al. | ............ 429/242 |
| 7,736,809 B2 | 6/2010 | Hwang et al. | |
| 2002/0022570 A1 * | 2/2002 | Reynolds, III | ........ C04B 35/536 |
| | | | 502/101 |
| 2002/0045088 A1 | 4/2002 | Bronel | |

(Continued)

FOREIGN PATENT DOCUMENTS

| | | |
|---|---|---|
| EP | 0913875 A2 | 5/1999 |
| EP | 1531514 A1 | 11/2004 |

(Continued)

OTHER PUBLICATIONS

International Search Report; International Application No. PCT/US2012/041507; International Filing Date: Jun. 8, 2012; Date of Mailing: Jan. 3, 2013; 6 pages.

(Continued)

*Primary Examiner* — Barbara Gilliam
*Assistant Examiner* — Stephan Essex
(74) *Attorney, Agent, or Firm* — LSIP Law LLC

(57) ABSTRACT

A current collector including: a polymer film including a first major surface, an opposite second major surface, and a plurality of openings extending through a thickness of the polymer film; a first layer on the first major surface of the polymer film; a second layer on the second major surface of the polymer film; and a third layer on an inner surface of an opening of the plurality of openings, wherein the third layer contacts the first layer and the second layer, and wherein the first layer, the second layer, and the third layer each independently has an electrical conductivity of greater than 10 Siemens per meter.

37 Claims, 14 Drawing Sheets

(56) References Cited

U.S. PATENT DOCUMENTS

| | | | |
|---|---|---|---|
| 2004/0126663 A1 | 7/2004 | Sudano et al. | |
| 2006/0105243 A1* | 5/2006 | Okamura et al. | 429/234 |
| 2008/0070098 A1 | 3/2008 | Ray, Jr. et al. | |
| 2008/0187824 A1 | 8/2008 | Tomantschger | |
| 2009/0246626 A1* | 10/2009 | Tasaki | H01G 11/86 |
| | | | 429/208 |
| 2009/0246629 A1* | 10/2009 | Nagai et al. | 429/209 |

FOREIGN PATENT DOCUMENTS

| | | |
|---|---|---|
| JP | 03276559 A | 12/1991 |
| JP | 05290853 A | 11/1993 |
| JP | 09022699 A | 1/1997 |
| JP | 09045334 A | 2/1997 |
| JP | 09120818 A | 5/1997 |
| JP | 09283149 A | 10/1997 |
| JP | 11283676 | 3/1998 |
| JP | 10106627 A | 4/1998 |
| JP | 10326628 A | 12/1998 |
| JP | 11007961 A | 1/1999 |
| JP | 11067218 A | 3/1999 |
| JP | 11067221 A | 3/1999 |
| JP | 11067222 A | 3/1999 |
| JP | 11097035 A | 4/1999 |
| JP | 11111261 A | 4/1999 |
| JP | 11185765 A | 7/1999 |
| JP | 11195415 A | 7/1999 |
| JP | 2005251429 | 9/2005 |
| JP | 2009158693 | 7/2009 |
| JP | 201027368 | 2/2010 |
| JP | 201080395 | 4/2010 |
| KR | 20080051647 | 11/2008 |
| RU | 2339123 C1 | 11/2008 |

OTHER PUBLICATIONS

Written Opinion of the Searching Authority; International Application No. PCT/US2012/041507; International Filing Date: Jun. 8, 2012; Date of Mailing: Jan. 3, 2013; 6 pages.

Japanese Patent No. JP2009158693; Publication date: Jul. 16, 2009; 1 pg.; Abstract only.

European Patent No. EP0913875; Publication date: May 6, 1999; 1 pg.; Abstract only.

European Patent No. EP1531514; Publication date: May 18, 2005; 1 pg.; Abstract only.

Japanese Patent No. JP09120818; Publication date: May 6, 1997; 1 pg.; Abstract only.

Japanese Patent No. JP09283149; Publication date: 0/31/1997; 1 pg.; Abstract only.

Japanese Patent No. JP9045334; Publiction date: Feb. 14, 1997; 1 pg. Abstract only.

Japanese Patent No. JP10106627; Publication date: Apr. 24, 1998; 1 pg.; Abstract only.

Japanese Patent No. JP10326628; Publication date: Dec. 8, 1998; 1 pg.; Abstract only.

Japanese Patent No. JP11007961: Publication date.: Jan. 12, 1999; 1 pg.; Abstract only.

Japanese Patent No. JP11067218; Publication date: Mar. 9, 1999; 1 pg.; Abstract only.

Japanese Patent No. JP11067221; Publication date: Mar. 9, 1999; 1 pg.; Abstract only.

Japanese Patent No. JP11067222; Publication date; Mar. 9, 1999; 1 pg.; Abstract only.

Japanese Patent No. JP11097035: Publication date: Apr. 9, 1999; 1 pg.; Abstract only.

Japanese Patent No. JP11111261; Publication date; Apr. 23, 1999; 1 pg.; Abstract only.

Japanese Patent No. JP11185765; Publication date: Jul. 9, 1999; 1 pg.; Abstract only.

Japanese Patent No. JP11195415: Publication date: Jul. 21, 1999; 1 pg.; Abstract only.

Japanese Patent No. JP11283672; Publication date; Oct. 15, 1999; 1 pg.; Abstract only.

Japanese Patent No. JP11283676; Publication date: Oct. 15, 1999; 1 pg.; Abstract only.

Japanese Patent No. JP2005251429; Publication date: Sep. 15, 2005; 1 pg.; Abstract only.

Japanese Patent No. JP2010027368; Publication date: Feb. 4, 2010; 1 Pg.; Abstract only.

Jaapanese Patent No. JP2010080395; Publication date: Apr. 8, 2010; 1 pg.; Abstract only.

Japanese Patent No. JP3276559; Publication date: Dec. 6, 1991; 1 pg.; Abstract only.

Japanese Patent No. JP5290853; Publication date: Nov. 5, 1993; 1 pg.; Abstract only.

Japanese Patent No. JP9022699; Publication date: Jan. 21, 1997; 1 pg.; Abstract only.

Republic of Korea Patent No. KR20080051647; Publication date: Jun. 11, 2008; 1 pg.; Abstract only.

Russian Patent No. RU2339123; Publication date: Nov. 20, 2008; 1 pg.; Abstract only.

* cited by examiner

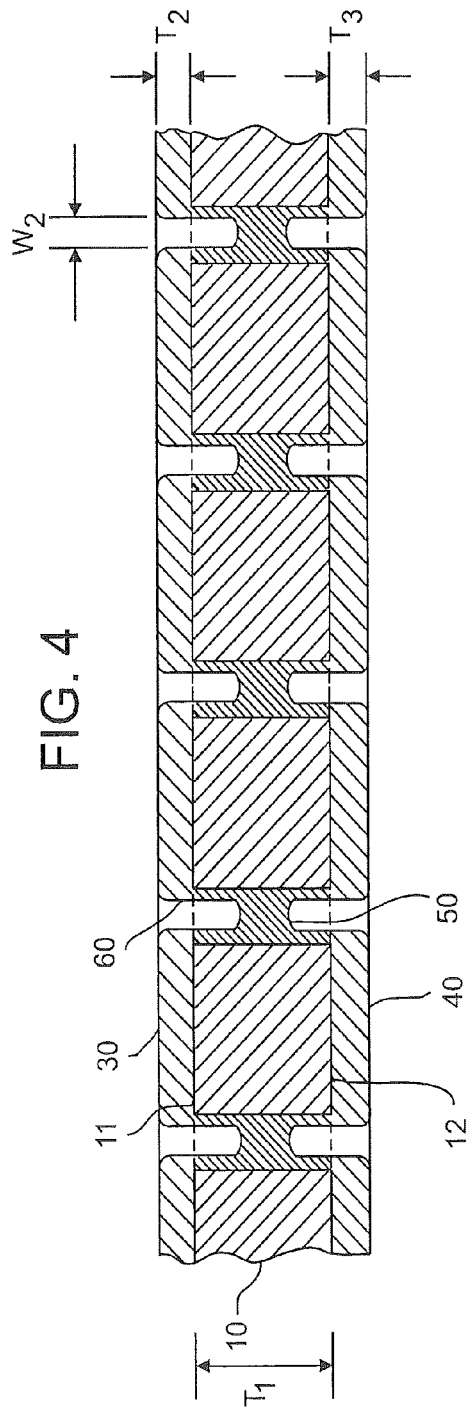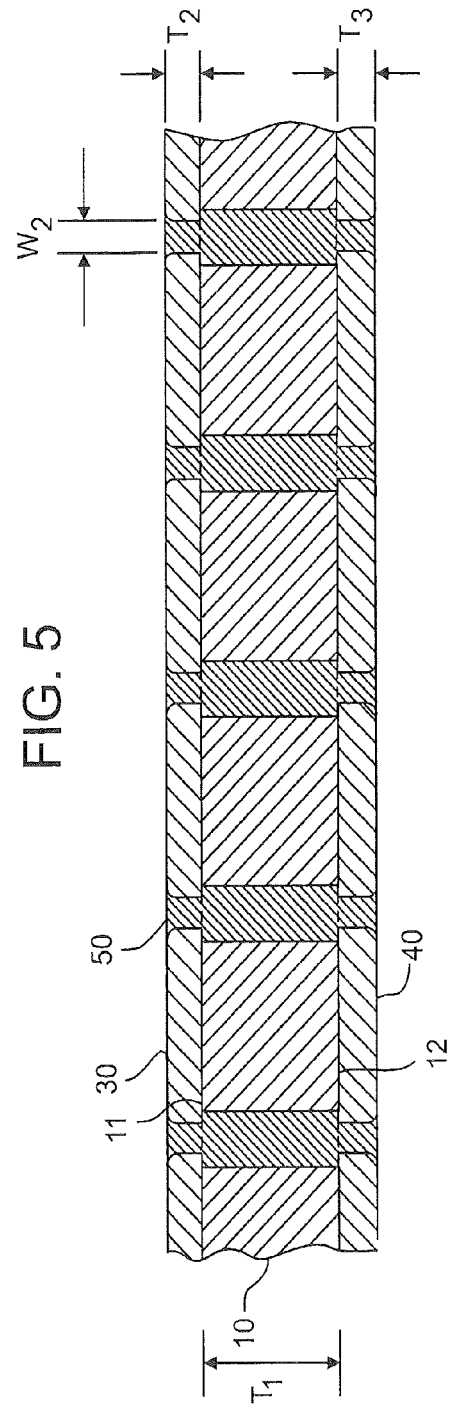

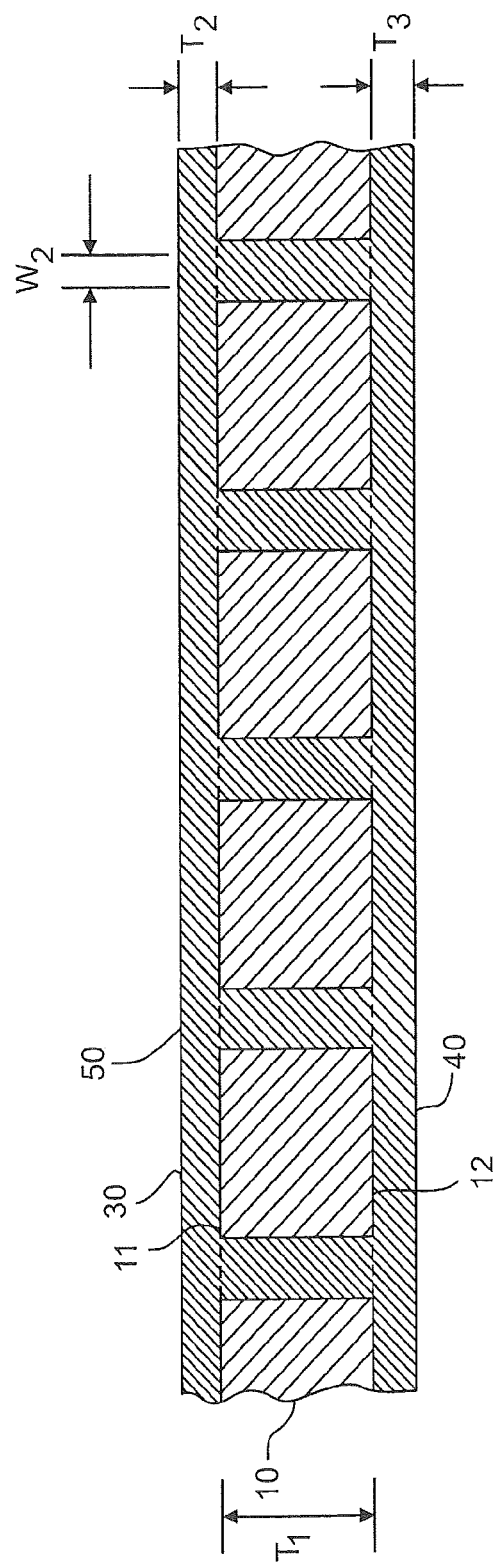

LAYERED COMPOSITE CURRENT COLLECTOR WITH PLURALITY OF OPENINGS, METHODS OF MANUFACTURE THEREOF, AND ARTICLES INCLUDING THE SAME

BACKGROUND OF THE INVENTION (1) Field of the Invention

This disclosure relates to a composite current collector for a battery, methods of manufacturing the composite current collector, and articles including the same.

(2) Description of the Related Art

Batteries generally include a positive electrode, a negative electrode, and a separator disposed between the positive electrode and the negative electrode. The positive electrode and the negative electrode each include an electrode material disposed on a metal foil. In a commercial roll-to-roll electrode manufacturing process, the metal foil is coated with the electrode material to provide the electrode. To manufacture a battery, the positive electrode, a separator, and the negative electrode are combined in an automated process to provide an electrode assembly.

Thus the metal foil serves as a current collector, i.e., conducting electrons between the electrode material and a terminal of the battery, and serves as a mechanically supportive substrate during both the manufacture of the electrode and the battery assembly process. To permit use of low-cost and high-speed automated manufacturing processes, the metal foil desirably has sufficient strength to accommodate roll-to-roll processing.

The amount of energy a battery can provide per unit weight is referred to as its specific energy, and the amount of power a battery can provide per unit weight is referred to as its specific power. For weight-sensitive applications, such as airplanes, rockets, or extra-terrestrial vehicles, a lighter weight battery, more specifically a battery having improved specific energy and/or specific power, would be desirable. Thus there remains a need for a lighter weight current collector that provides sufficient strength to permit roll-to-roll processing and has sufficient conductivity for current collection.

BRIEF SUMMARY OF THE INVENTION

Disclosed is a current collector including: a polymer film including a first major surface, an opposite second major surface, and a plurality of openings extending through a thickness of the polymer film; a first layer on the first major surface of the polymer film; a second layer on the second major surface of the polymer film; and a third layer on an inner surface of the plurality of openings, wherein the third layer contacts the first layer and the second layer, and wherein the first layer, the second layer, and the third layer each independently has an electrical conductivity of greater than 10 Siemens per meter.

Also disclosed is an electrode including: the current collector disclosed above; and further including an electrode material on at least one of the first layer, the second layer, or the third layer of the current collector.

Also disclosed is a battery including the electrode disclosed above, wherein the battery is a lithium-ion or a lithium polymer battery.

Also disclosed is a method of manufacturing a current collector, the method including: providing a polymer film including a first major surface and an opposite second major surface; perforating the polymer film to provide a perforated polymer film; disposing a first layer on the first major surface of the polymer film; disposing a second layer on the second major surface of the polymer film; and disposing a third layer on a surface of a perforation of the perforated polymer film to manufacture the current collector, wherein the third layer contacts the first layer and the second layer, and wherein the first layer, the second layer, and the third layer each independently has an electrical conductivity of greater than 10 Siemens per meter.

Also disclosed is a method of manufacturing an electrode, the method including: providing a current collector according to the foregoing method; and disposing an electrode material on the current collector to manufacture the electrode.

These and other features, aspects, and advantages of the disclosed embodiments will become better understood with reference to the following description and appended claims.

BRIEF DESCRIPTION OF THE DRAWINGS

The above and other aspects, advantages and features of this disclosure will become more apparent by describing in further detail exemplary embodiments thereof with reference to the accompanying drawings, in which:

FIG. 4 is a schematic cross-section diagram of an embodiment of the composite current collector wherein an opening is occluded and partially filled by the third layer;

FIG. 5 is a schematic cross-section diagram of an embodiment of the composite current collector, wherein the opening is occluded and completely filled by the third layer;

FIG. 6 is a schematic cross-section diagram of an embodiment of the composite current collector wherein an opening is occluded and completely filled by the third layer;

Figure 1:
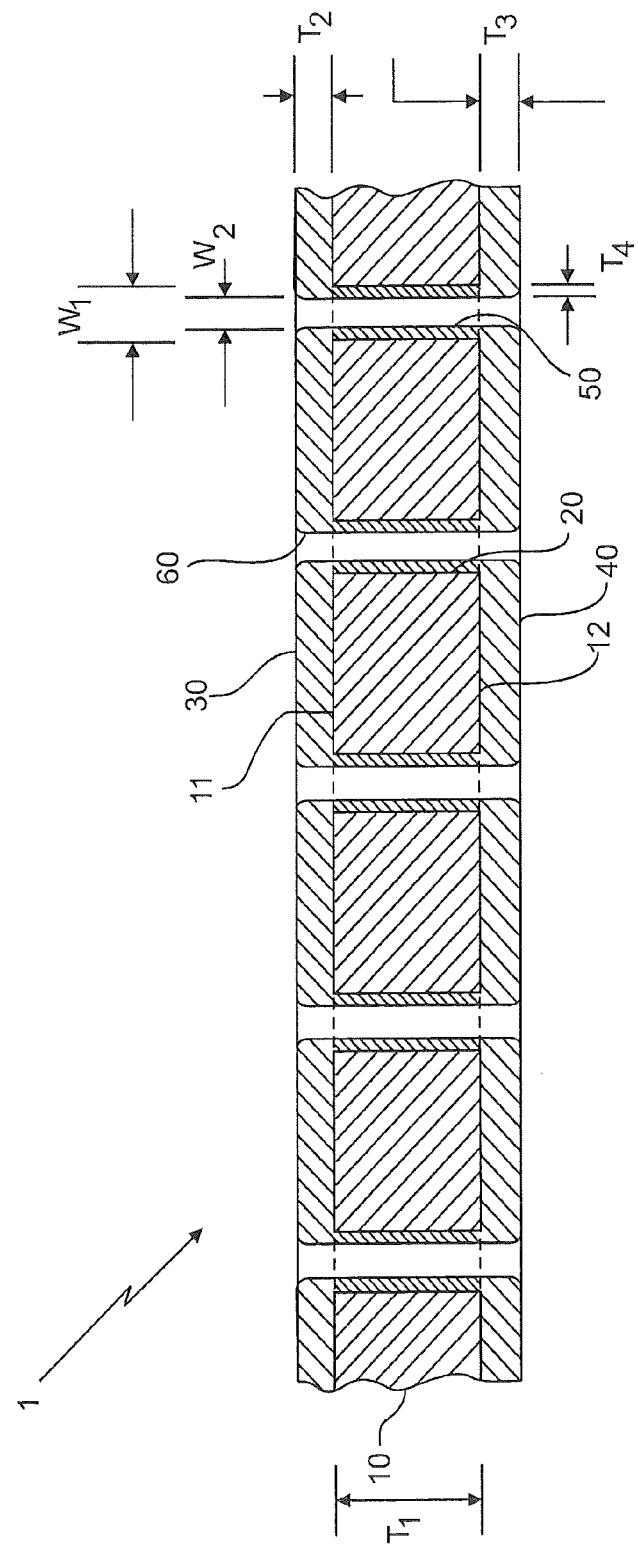
FIG. 1. is a schematic cross-section diagram of an embodiment of a composite current collector.

The detailed description explains the disclosed embodiments, together with advantages and features, by way of example with reference to the drawings.

DETAILED DESCRIPTION OF THE INVENTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer, or section from another element, component, region, layer, or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In a lithium-ion battery, aluminum and copper are useful materials for the current collector of the positive and negative electrodes, respectively. Specifically, commercial lithium-ion batteries use a solid metal foil current collector, e.g., aluminum foil for the positive electrode and copper or aluminum foil for the negative electrode. When a solid metal foil current collector material is used, a single contact to a single side of the current collector is sufficient to collect current from both sides of the current collector because of the high conductivity of the solid metal foil. However to permit use of economic manufacturing processes, the thickness of the aluminum and copper foils are selected to provide sufficient strength, e.g., a strength sufficient to permit use of roll-to-roll and winding processes. This thickness results in a current collector that has greater current carrying capability than is useful for many applications. Thus the strength of the current collector may effectively be the determining factor of an appropriate thickness of the current collector. This effect is more pronounced for highly conductive materials and/or relatively weak materials, such copper and aluminum. Thus when a solid metal foil current collector is used, a battery may have a current collector that has a metal content and a conductivity that is in excess of what would otherwise be sufficient for current conduction.

Disclosed herein is a composite current collector that provides sufficient strength to permit use of commercial roll-to-roll processes and is of lower density than metals such as copper or aluminum. An electrode fabricated with the composite current collector is lighter than a commercially available electrode. Thus the electrode fabricated with the composite current collector can reduce the weight of a battery, thereby increasing a specific energy and/or a specific power of the battery.

Figure 2:
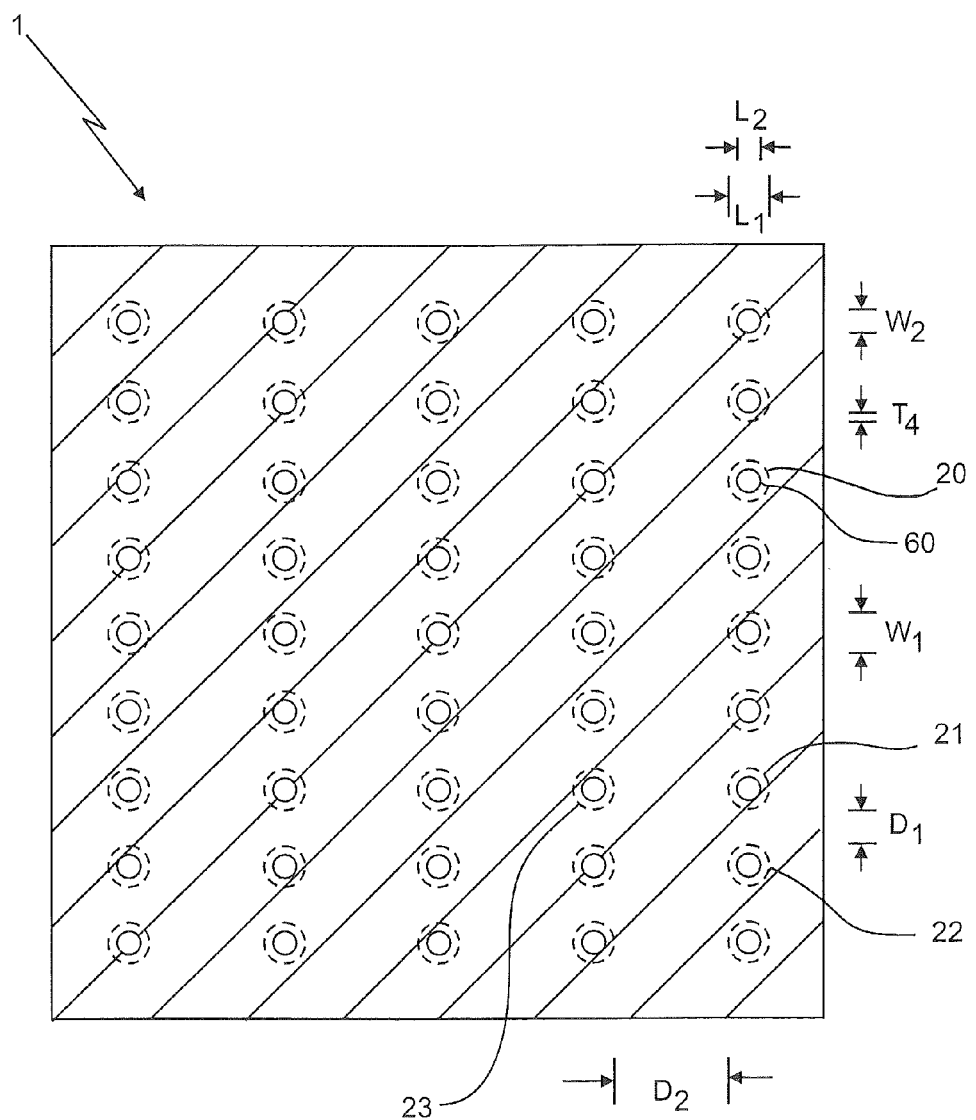
FIG. 2 is a schematic plan view of the composite current collector of FIG. 1.

FIG. 1 is a schematic cross-section view of an embodiment of the composite current collector 1. FIG. 2 is a plan view of the composite current collector 1. In an embodiment, the composite current collector comprises a polymer film 10 comprising a first major surface 11, an opposite second major surface 12, and a plurality of openings 20 extending through a thickness $T_1$ of the polymer film; a first layer 30 on the first major surface of the polymer film; a second layer 40 on the second major surface of the polymer film; and a third layer 50 on an inner surface of the openings of the plurality of openings, wherein the third layer contacts the first layer and the second layer. In an embodiment the third layer electrically connects the first and second layers. Also, the third layer 50 can fully or partially fill an opening of the plurality of openings of the polymer film 10. In an embodiment, a portion of the plurality of openings is open, and another portion of the plurality of openings is filled by the third layer. In addition, the third layer 50 can extend past the inner surface of the openings and towards an outer surface of the first layer 30 and the second layer 40. In an embodiment, the third layer 50 fills an entirety of the plurality of openings 20.

The polymer film 10 may have a thickness $T_1$ of 1 to 100 micrometers (μm), specifically 2 to 50 μm, more specifically 3 to 25 μm, and may have a thickness in a narrower range lying within the aforesaid range, for example, 4 to 10 μm. The thickness of the polymer film $T_1$ may be taken perpendicular to a major surface of the polymer film 10. The polymer film 10 may be a continuous layer.

The polymer film 10 comprises a plurality of openings 20 extending through the thickness of the polymer film 10. The polymer film 10 may solely define the openings 20 such that the polymer film defines the walls of the openings 20. The openings may each independently have any shape, and in an embodiment may have a same shape. A shape of the openings 20 in a plan view of the polymer film 10 may be, for example, circular, square, rectangular, or elliptical. A combination comprising at least one of the foregoing shapes can be used. A polymer film wherein each opening has an elliptical shape is specifically mentioned. The shape may be in the form of a slit in the polymer film 10.

A width $W_1$ of the openings taken in a first direction may be 0.1 to 10,000 μm, specifically 0.5 to 1000 μm, more specifically 1 to 100 μm, and any narrower range lying within the aforesaid range. In another embodiment, each opening of the plurality of openings has a width $W_1$ of 0.1 to 10,000 μm, specifically 0.5 to 1000 μm, more specifically 1 to 100 μm, and any narrower range lying within the aforesaid range. Also, an average largest width of the openings may be 0.1 to 10,000 μm, specifically 0.5 to 1000 μm, more specifically 1 to 100 μm, and any narrower range lying within the aforesaid range. The first direction may be parallel to a major surface of the polymer film 10.

A length $L_1$ of the openings may be 0.1 to 10,000 μm, specifically 0.5 to 1000 μm, more specifically 1 to 100 μm, and any narrower range lying within the aforesaid range. In another embodiment, each opening of the plurality of openings has a length $L_1$ of 0.1 to 10,000 μm, specifically 0.5 to 1000 μm, more specifically 1 to 100 μm, and any narrower range lying within the aforesaid range. Also, an average largest length of the openings may be 0.1 to 10,000 μm, specifically 0.5 to 1000 μm, more specifically 1 to 100 μm, and any narrower range lying within the aforesaid range. The length $L_1$ may be taken in a second direction that is perpendicular to the first direction and is also parallel to the major surface of the polymer film 10.

Figure 3:
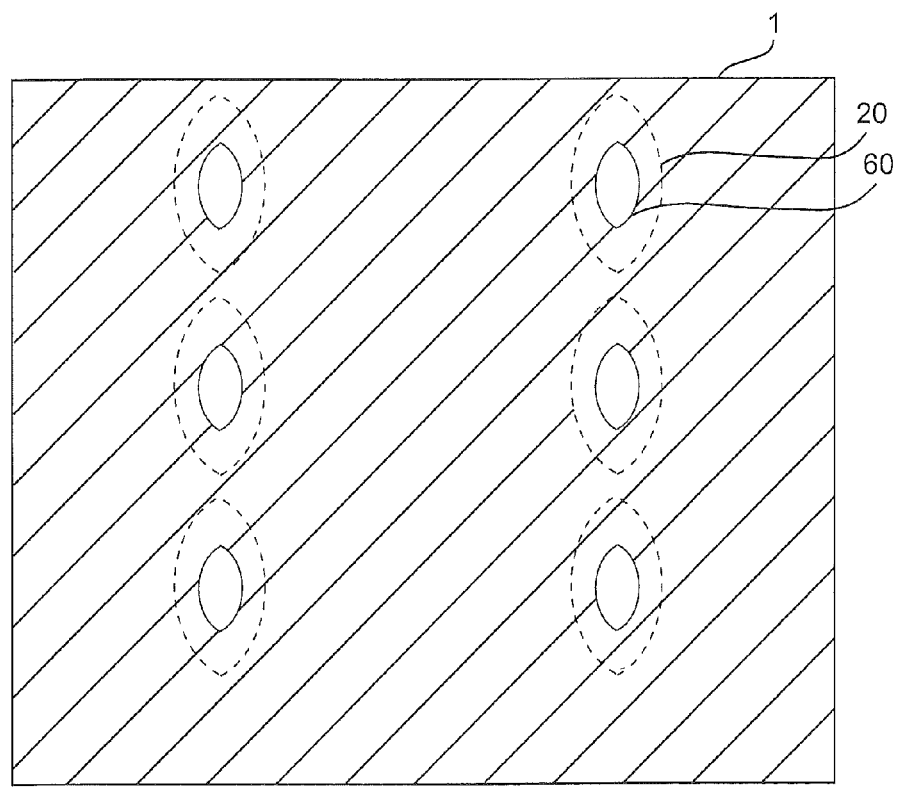
FIG. 3 is a schematic plan view of an embodiment of the composite current collector.

Also, a ratio of the width $W_1$ to the length $L_1$ of the openings may be 1000:1 to 1:1, specifically 100:1 to 2:1, more specifically 50:1 to 3:1. In an embodiment the openings may be circular and have a ratio of the width $W_1$ to the length $L_1$ of 1:1 as shown in FIG. 2. A circular opening comprising a width (e.g., diameter) of 200 to 300 μm is specifically mentioned. In another embodiment the openings may be elliptical and have a ratio of the width $W_1$ to the length $L_1$ of 1000:1 to 2:1 as shown in FIG. 3.

The openings may be disposed in the polymer film in any suitable pattern, and can be disposed in a hexagonal, quadrilateral, square, random, or other pattern. A first distance $D_1$ taken in the first direction and between a first opening 21 and an adjacent second opening 22 of the plurality of openings may be 0.01 to 50 millimeters (mm), specifically 0.1 to 40 mm, and any narrower range lying within the aforesaid range, such as 1 to 30 mm. Also, a second distance $D_2$ taken in the second direction and between the first opening 21 and an adjacent third opening 23 of the plurality of openings may be 0.01 to 50 millimeters (mm), specifically 0.1 to 40 mm, and any narrower range lying within the aforesaid range, such as 1 to 30 mm.

Figure 9:
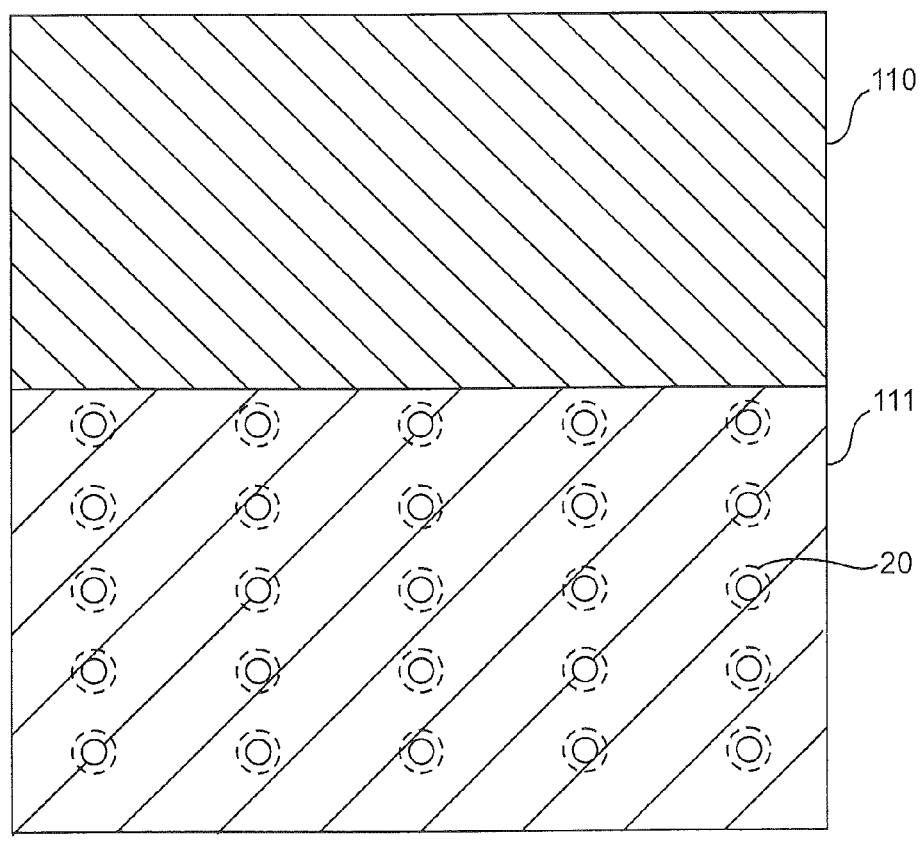
FIG. 9 is a schematic plan view of an embodiment of the composite current collector.

Also, the openings may be disposed in only a portion of the composite current collector. In an embodiment, the composite current collector may comprise a first portion 110 and a second portion 111, as illustrated in FIG. 9. The openings 20 may be disposed in only the second portion 111 and not in the first portion 110. In an embodiment, the first portion comprises 10 to 99.9%, specifically 75 to 98%, and any narrower range lying within the aforesaid range, such as 30 to 70%, of the total area of the composite current collector. In an embodiment, the first portion comprises 30% of the total area of the composite current collector.

The polymer film 10 may comprise a thermoplastic. Suitable thermoplastics include both halogenated thermoplastics and non-halogenated thermoplastics. The halogenated thermoplastic may be a fluorinated thermoplastic. Non-limiting examples of the thermoplastic include a polyacetal, polyolefin, polyacrylic, polycarbonate, polystyrene, polyester, polyamide, polyamideimide, polyarylate, polyarylsulfone, polyethersulfone, polyphenylene sulfide, polyvinyl chloride, polysulfone, polyimide, polyetherimide, polytetrafluoroethylene, polyetherketone, polyether etherketone, polyether ketone ketone, polybenzoxazole, polyphthalide, polyacetal, polyanhydride, polyvinyl ether, polyvinyl thioether, polyvinyl alcohol, polyvinyl ketone, polyvinyl halide, polyvinyl nitrile, polyvinyl ester, polysulfonate, polysulfide, polythioester, polysulfone, polysulfonamide, polyurea, and polyethylene terephthalate. A combination comprising at least one of the foregoing can be used, and the thermoplastic may be a copolymer or a blend, for example.

In an embodiment the thermoplastic is the polymeric reaction product of an aromatic dianhydride and an aromatic diamine, such as a copolymer of 1,4-benzenediamine and 1,2,4,5-benzenetetracarboxylic acid dianhydride.

In an embodiment, the fluorinated thermoplastic may comprise a commercially available copolymer of one or more fluorine containing monomers, including vinylidene fluoride, hexafluoropropylene, tetrafluoroethylene, or perfluorovinyl ether. The fluorinated copolymer may also comprise a repeating unit derived from a non-fluorinated monomer, such as an olefin, such as ethylene or propylene.

The fluorinated thermoplastic may be fully fluorinated, and may comprise a copolymer of tetrafluoroethylene ("TFE") and a perfluoroalkyl vinyl ether, and may comprise a copolymer of TFE and perfluoropropyl vinyl ether or a copolymer of TFE and perfluoromethyl vinyl ether. A fluorinated thermoplastic comprising a copolymer of TFE and hexafluoropropylene is specifically contemplated.

The thermoplastic may be partially fluorinated. Partially fluorinated thermoplastic polymers include a copolymer of ethylene and TFE ("E-TFE"), a copolymer of ethylene and chlorotrifluoroethylene ("E-CTFE"), and polyvinylidene fluoride ("PVdF"). Suitable thermoplastic copolymers of vinylidene fluoride include, without limitation, copolymers with perfluoroolefins such as hexafluoropropylene ("HFP"), and copolymers with chlorotrifluoroethylene. Thermoplastic terpolymers may also be used. These include thermoplastic terpolymers of TFE, HFP, and vinylidene fluoride.

Examples of a blend of thermoplastic polymers include acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadienestyrene, polycarbonate/thermoplastic urethane, polycarbonate/polyethylene terephthalate, polycarbonate/polybutylene terephthalate, thermoplastic elastomer alloys, nylon/elastomers, polyester/elastomers, polyethylene terephthalate/polybutylene terephthalate, acetal/elastomer, styrene-maleicanhydride/acrylonitrile-butadiene-styrene, polyether etherketone/polyethersulfone, polyether etherketone/polyetherimide polyethylene/nylon, and polyethylene/polyacetal. A combination comprising at least one of the foregoing can be used.

In an embodiment, poly(ethylene-co-tetrafluoroethylene) ("ETFE"), polyethylene terephthalate, or polyimide are specifically mentioned. The polyethylene terephthalate may be biaxially-oriented polyethylene terephthalate, and may be MYLAR. The poly(ethylene-co-tetrafluoroethylene) may be TEFZEL. The polyimide may be poly(4,4'-oxydiphenylene-pyromellitimide), and may be KAPTON. MYLAR, TEFZEL, and KAPTON are available from E.I. Du Pont de Nemours and Company of Wilmington, Del.

The thermoplastic may have a molecular weight of 10,000 to 5,000,000 Daltons, specifically 20,000 to 3,000,000 Daltons.

The openings may be disposed in the polymer film by any suitable means, including perforating, punching, cutting, slitting, dissolution of a secondary species, partial dissolution of the primary species, stretching, or heat treating. Laser perforation is specifically mentioned.

Figure 8:
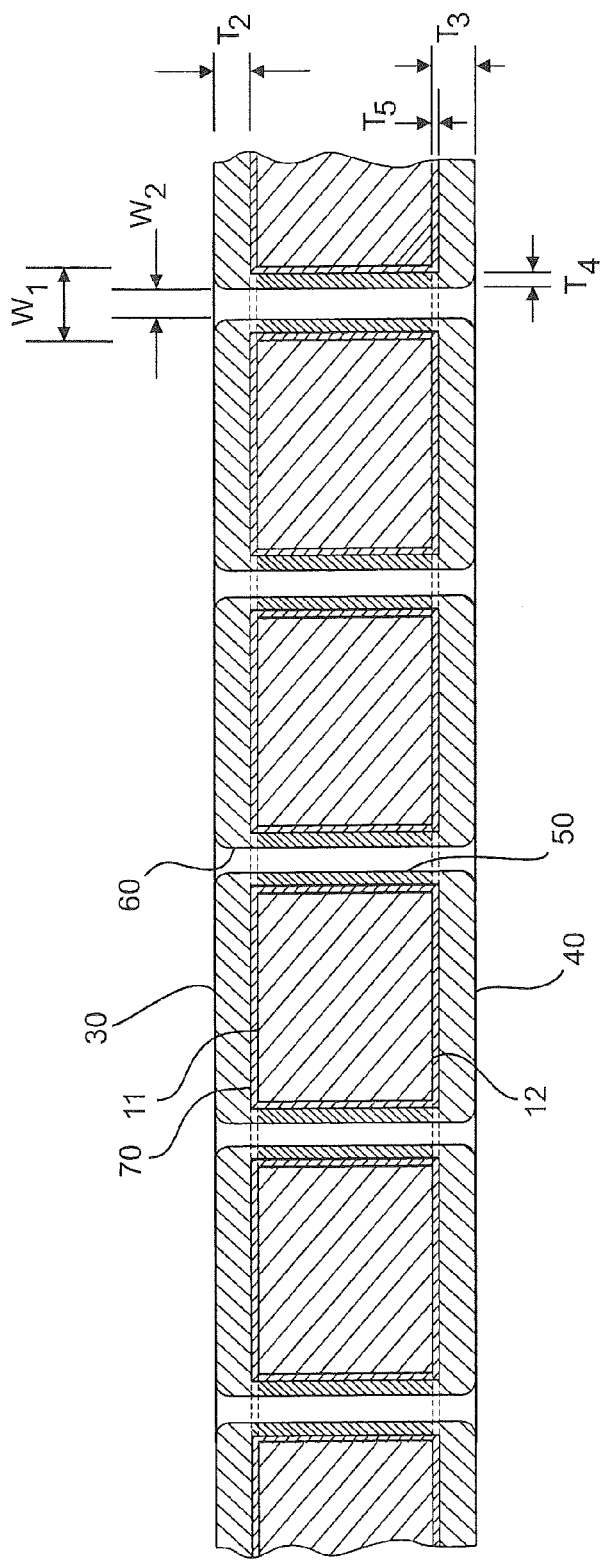
FIG. 8. is a schematic cross-section diagram of an embodiment of the composite current collector including an interlayer.

The first layer 30 and the second layer 40, which are on the first and second major surfaces of the polymer film 10, respectively, and the third layer 50, which is on a surface of the openings 20, may be directly on the polymer film 10, or another layer may be disposed therebetween, such as interlayer 70 as shown in FIG. 8. The third layer 50 contacts the first layer 30 and the second layer 40, and the third layer 50 may connect the first layer 30 and the second layer 40. The first layer 30 may be in electrical communication with the first layer 30 and/or the second layer 40. The third layer may be on an inner surface of the openings 20, and may be on an entire surface of the openings 20.

In an embodiment the third layer 50 defines a plurality of through-holes 60 as shown in FIG. 1. The through-holes 60 may have any shape, and may be, for example, circular, square, rectangular, or elliptical. A combination comprising at least one of the foregoing can be used. An elliptical shape is specifically mentioned. The shape of the through-holes 60 may be in a plan view of the composite current collector. The through-holes may extend completely through the composite current collector and in a direction perpendicular to a major surface of the polymer film 10. The through-holes may extend through the first layer 30, the second layer 40, and the polymer film 10. In an embodiment, the through-holes are open, i.e. the through-holes provide for fluid communication between opposite sides of the composite current collector. In an embodiment, the through-holes are open and the third layer 50 fills 1 to 99 percent (%), specifically 10 to 90%, more specifically 20 to 80% of a total volume of the openings 20.

In another embodiment, the third layer occludes and partially or entirely fills the openings 20 as shown in FIGS. 4 and 5, respectively. The openings 20 may be occluded by the third layer 50 and the third layer 50 may fill 1 to 100%, specifically 10 to 90%, more specifically 20 to 80% of the total volume of the openings 20.

In an embodiment, the first layer 30, the second layer 40, and the third layer 50 comprise a same metal, and the third layer 50 fills the openings 20, as illustrated in FIG. 6.

Figure 7:
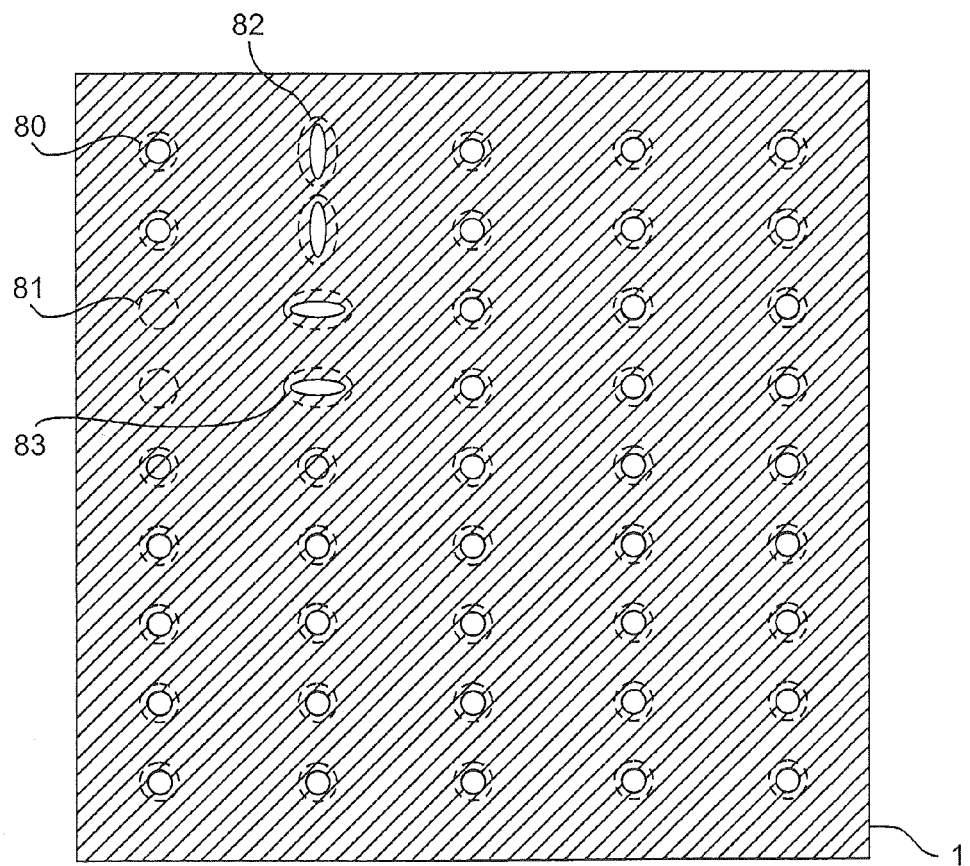
FIG. 7 is a plan view of an embodiment of the composite current collector.

In another embodiment, the composite current collector comprises openings and through-holes of a variety of shapes, and comprises filled and un-filled openings, as is illustrated in FIG. 7. In an embodiment, the composite current collector may comprise a unfilled through-hole 80, a filled through-hole 81, an elliptical through-hole having a first orientation 82, and an elliptical through-hole of a second orientation 83, for example.

A thickness $T_2$ of the first layer 30, a thickness $T_3$ of the second layer 40, and a thickness $T_4$ of the third layer 50 may each independently be 0.01 to 25 µm, specifically 0.1 to 20 µm, more specifically 1 to 15 µm, and may be a thickness in a narrower range lying within the aforesaid range, for example, 2 to 10 µm. The thickness $T_2$ of the first layer and a thickness $T_3$ of the second layer may be taken in a direction perpendicular to a major surface of the polymer film. The thickness $T_3$ of the third layer may be taken in a direction perpendicular to the openings. The direction perpendicular to the openings may be parallel to a major surface of the polymer film. In an embodiment the thickness $T_2$ of the first layer and a thickness $T_3$ of the second layer are the same. In another embodiment, the thickness $T_2$ of the first layer, the thickness $T_3$ of the second layer, and the thickness $T_4$ of the third layer are the same.

A width $W_2$ of the through-holes taken in the first direction may be 0 to 10,000 micrometers (µm), specifically 0.5 to 1000 µm, more specifically 1 to 100 µm, and any narrower range lying within the aforesaid range. In another embodiment, each through-hole of the plurality of through-holes has a width $W_2$ of 0 to 10,000 µm, specifically 0.5 to 1000 µm, more specifically 1 to 100 µm, and any narrower range lying within the aforesaid range. Also, an average largest width $W_2$ of the through-holes may be 0.1 to 10,000 µm, specifically 0.5 to 1000 µm, more specifically 1 to 100 µm, and any narrower range lying within the aforesaid range.

A length $L_2$ of the through-holes taken in the second direction may be 0 to 10,000 micrometers (µm), specifically 0.5 to 1000 µm, more specifically 1 to 100 µm, and any narrower range lying within the aforesaid range. In another embodiment, each through-hole of the plurality of through-holes has a length $L_2$ of 0 to 10,000 µm, specifically 0.5 to 1000 µm, more specifically 1 to 100 µm, and any narrower range lying within the aforesaid range. Also, an average largest length $L_2$ of the through-holes may be 0 to 10,000 µm, specifically 0.5 to 1000 µm, more specifically 1 to 100 µm, and any narrower range lying within the aforesaid range.

In an embodiment the through-hole may be filled with the third layer 50, and the width $W_2$ and the length $L_2$ may each be 0.

Also, a ratio of the width $W_2$ to the length $L_2$ of the through-holes may be 1000:1 to 1:1, specifically 100:1 to 2:1, more specifically 50:1 to 3:1. In an embodiment the through-holes may comprise a circular shape and have a ratio of the width $W_2$ to the length $L_2$ of 1:1 as shown in FIG. 2. A circular through-hole comprising a width (e.g., diameter) of 200 to 300 µm is specifically mentioned. In another embodiment the openings may be elliptical and have a ratio of the width $W_2$ to the length $L_2$ of 1000:1 to 2:1 as shown in FIG. 3.

In an embodiment, the composite current collector may have the dimensions provided in Table 1.

TABLE 1

| Parameter | Description | Value |
| --- | --- | --- |
| $T_1$ | Polymer film thickness | 1 to 100 μm |
| $T_2$ | first layer thickness | 0.01 to 25 μm |
| $T_3$ | second layer thickness | 0.01 to 25 μm |
| $T_4$ | third layer thickness | 0.01 to 25 μm |
| $W_1$ | opening width | 1 to 10,000 μm |
| $W_2$ | through-hole width | 0 to 10,000 μm |
| $L_1$ | opening width | 1 to 10,000 μm |
| $L_2$ | through-hole width | 0 to 10,000 μm |
| $D_1$ | opening spacing in first direction | 0.01 to 50 mm |
| $D_2$ | opening spacing in second direction | 0.01 to 50 mm |

The first layer 30, the second layer 40, and the third layer 50 each independently comprise a conductor. In an embodiment the conductor may be a metal. In an embodiment, the first layer 30, the second layer 40, and the third layer 50 may comprise a same conductor, or the first layer 30, the second layer 40, and the third layer 50 may each comprise a different conductor. Alternatively, two of the first layer 30, the second layer 40, and the third layer 50 may comprise the same conductor and the other of the first layer 30, the second layer 40, and the third layer 50 may comprise a different conductor. The first layer 30, the second layer 40, and the third layer 50 can be a continuous, single layer. In an embodiment, the first layer 30, the second layer 40, and the third layer 50 consist essentially of a same conductor. An embodiment in which the first layer 30, the second layer 40, and the third layer 50 consist of the same conductor is specifically mentioned.

The conductor may comprise an element of Groups 3 to 15 of the Periodic Table of the Elements, and in an embodiment comprises a metal of Groups 3 to 15 of the Periodic Table of the Elements. In an embodiment the conductor consists of an element of Groups 3 to 15 of the Periodic Table of the Elements. In an embodiment, the element of Groups 3 to 15 comprises Ti, V, Cr, Mn, Fe, Co, Ni, Pd, Pt, Cu, Ag, Bi, Pb, Au, Zn, Al, C, Si, or Sn. A combination comprising at least one of the foregoing can be used. In another embodiment, the conductor comprises Ni, Cu, Ag, Al, or Sn. A combination comprising at least one of the foregoing can be used. In yet another embodiment, the conductor comprises C. In yet another embodiment, the conductor comprises Cu or Al. In yet another embodiment the first layer 30, the second layer 40, and the third layer 50 each consist essentially of Cu, or an alloy thereof. In yet another embodiment the first layer 30, the second layer 40, and the third layer 50 each consist essentially of Al, or an alloy thereof.

The first layer, the second layer, and the third layer may each independently have an electrical conductivity of 10 to $10^8$ Siemens per meter, specifically 100 to $5 \times 10^7$ Siemens per meter, and any narrower range lying within the aforesaid range, for example $10^3$ to $10^6$ Siemens per meter.

The first layer 30, the second layer 40, the third layer 50, and the interlayer 70 may each independently be disposed by sputter deposition, physical vapor deposition, electroplating, electroless plating, chemical vapor deposition, metal-organic chemical vapor deposition, plasma-enhanced chemical vapor deposition, spraying, painting, metering, ink-jet deposition, or low pressure chemical vapor deposition. Sputter deposition is specifically mentioned. Additional details of the method of depositing the first layer 30, the second layer 40, the third layer 50, or the interlayer 70 may be determined by one of skill in the art without undue experimentation.

The composite current collector may further comprise the interlayer 70 interposed between the polymer film 10 and at least one of the first layer 30, the second layer 40, and the third layer 50 as is illustrated in FIG. 8. The interlayer 70 may have the same thickness and may comprise the same conductor as the first layer. In an embodiment, the interlayer 70 is directly on the polymer film 10, and the first layer 30, the second layer 40, and the third layer 50 are each directly on the interlayer 70. In an embodiment, the interlayer 70 may have a thickness $T_5$, and the thickness $T_5$ may be 0.01 to 25 μm, specifically 0.1 to 20 μm, more specifically 1 to 15 μm, and may be a thickness in a narrower range lying within the aforesaid range, for example, 2 to 10 μm.

A method of manufacturing a current collector comprises providing a polymer film comprising a first major surface and an opposite second major surface; perforating the polymer film to provide a perforated polymer film; disposing a first layer on the first major surface of the polymer film; disposing a second layer on the second major surface of the polymer film; and disposing a third layer on a surface of an opening of the plurality of openings, wherein the third layer contacts the first layer and the second layer, to manufacture the current collector. The method may further comprise disposing the interlayer 70 directly on the polymer film. The metal layers, e.g., the first, second, and third layers, may be disposed in any order or simultaneously. In an embodiment the first, second, and third layers are disposed at a same time. In an embodiment, for example when the first, second, and third layers are disposed at the same time, a distinct transition between the metal layers may not be present.

The method of manufacturing a current collector may further comprise filling the opening with the third layer.

Figure 10:
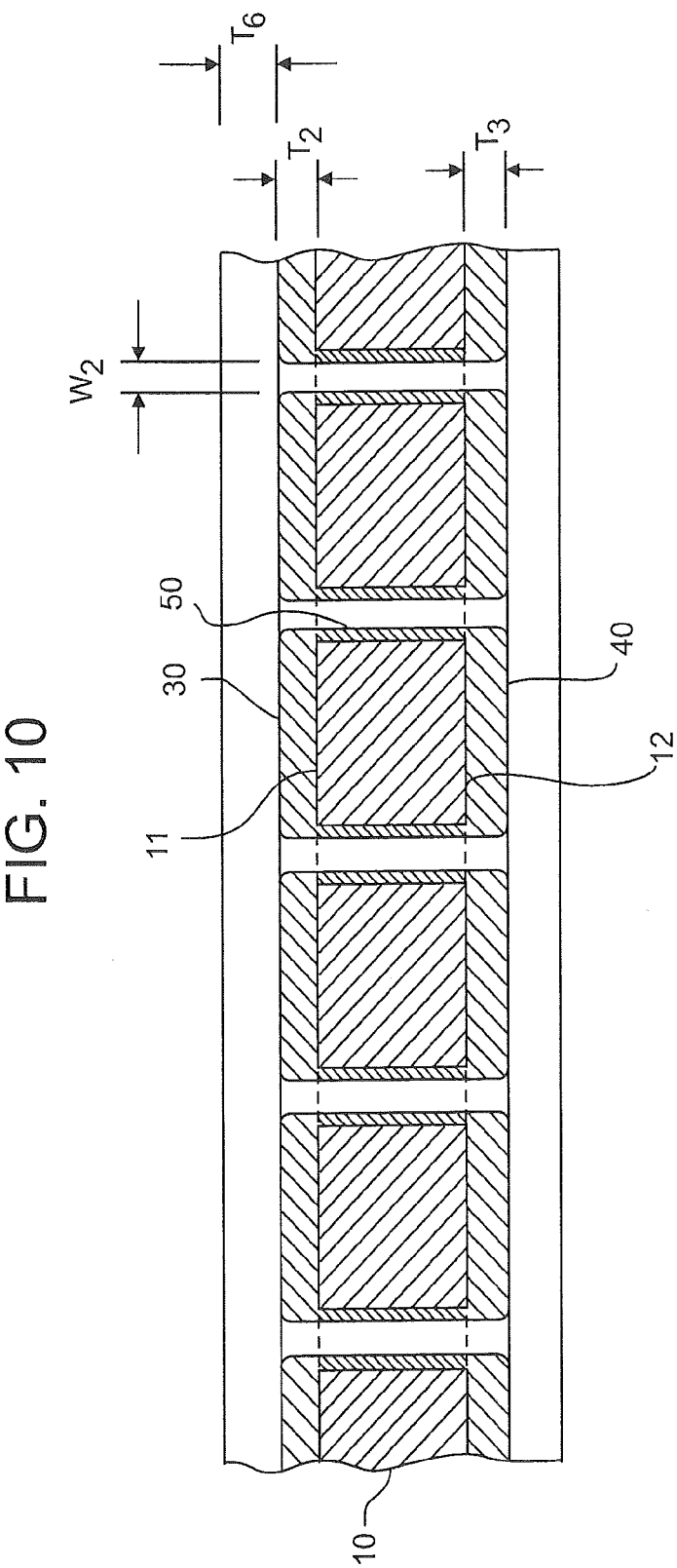
FIG. 10 is a cross-section diagram of an embodiment of an electrode including the composite current collector of FIG. 1.

An electrode comprises the composite current collector and an electrode material disposed thereon. FIG. 10 is a cross-section diagram of an embodiment of an electrode comprising the composite current collector of FIG. 1. As shown in FIG. 10, the electrode material may completely fill and occlude the through-hole of the composite current collector. In another embodiment, the electrode material may occlude and partially or substantially fill the through-hole. In an embodiment, 1 to 100%, specifically 5 to 98%, more specifically 10 to 96%, and any narrower range lying within the aforesaid range, such as 50 to 95%, or 60 to 94% of the through-holes of the current collector are occluded by the electrode material, based on a total number of through-holes.

Figure 11:
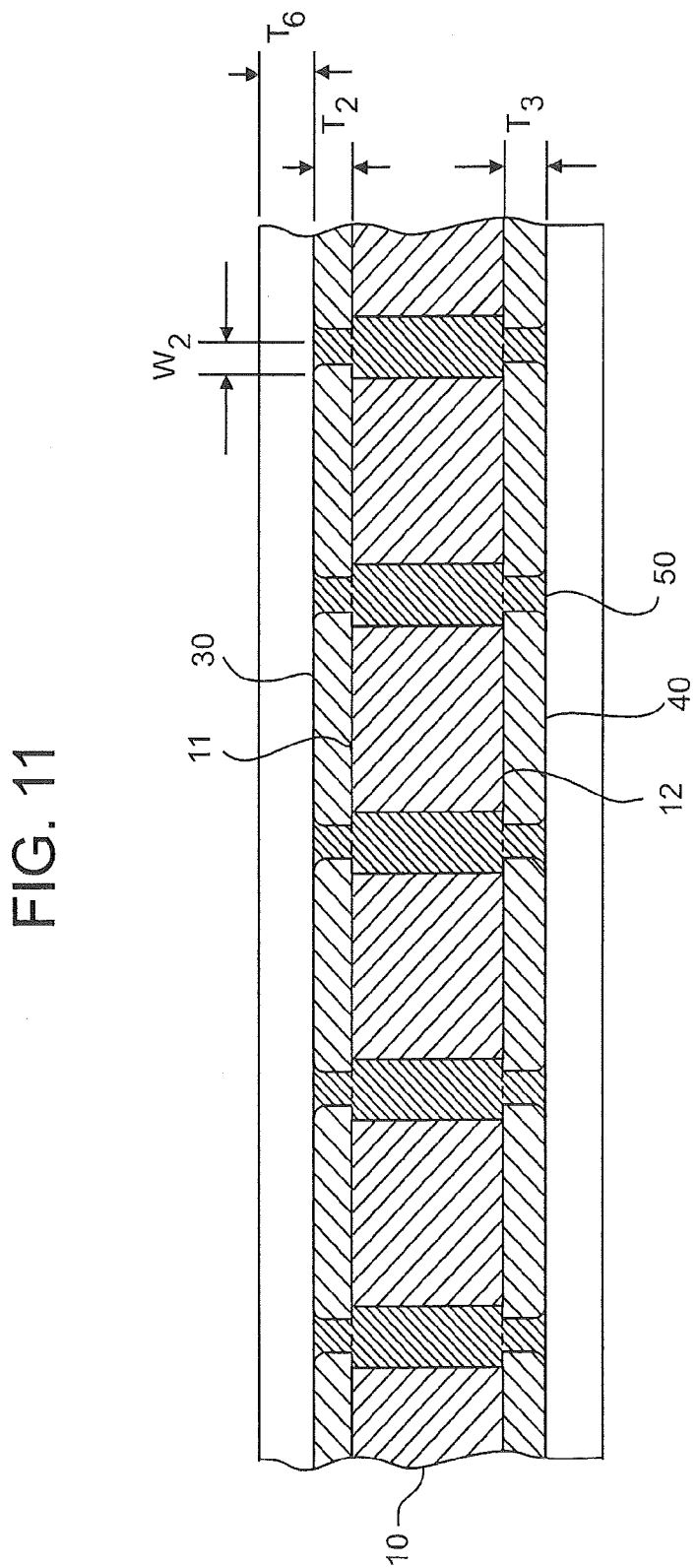
FIG. 11 is a cross-section diagram of an embodiment of an electrode including the composite current collector of FIG. 5.

FIG. 11 is a cross-section diagram of an embodiment of an electrode comprising the composite current collector of FIG. 5. As shown in FIG. 11, the third layer completely fills the through-hole 60 and the electrode material is disposed on the first layer 30, the second layer 40, and the third layer 50.

A thickness $T_6$ of the electrode material disposed on the composite current collector may be 10 to 1000 μm, specifically 20 to 500 μm, and any narrower range lying within the aforesaid range, such as 40 to 250 μm. The thickness of the electrode material may be taken in a direction perpendicular to a major surface of the polymer film 10.

The electrode may be a positive electrode, and may comprise a positive electrode material disposed on the composite current collector. The positive electrode material may comprise a positive active material capable of reversibly intercalating lithium, a binder, and an additive such as a conductive additive. Representative lithium-ion positive active materials include:

$LiAO_2$ wherein A is Co, Ni, or Mn;

$LiMn_2O_4$;

$Li_aNi_bB_cM_dO_2$ wherein $0.95 \le a \le 1.1$, $0 \le b \le 0.9$, $0 \le c \le 0.5$, $0.001 \le d \le 0.1$, B is Co or Mn, and M is Al, Cr, Mn, Fe, Mg, La, Ce, Sr, or V;

$Li_aNi_bCo_cMn_dM_eO_2$ wherein $0.95 \leq a \leq 1.1$, $0 \leq b \leq 0.9$, $0 \leq c \leq 0.5$, $0.001 \leq d \leq 0.5$, $0.001 \leq e \leq 0.1$, and M is Al, Cr, Mn, Fe, Mg, La, Ce, Sr, or V;

$Li_aAM_bO_2$ wherein $0.95 \leq a \leq 1.1$, $0.001 \leq b \leq 0.1$, and A is Co, Ni, or Mn, wherein M is Al, Cr, Mn, Fe, Mg, La, Ce, Sr, or V;

$TiS_2$; $MoS_2$; $NbSe_2$ $TiSe_2$, $MoSe_2$, $WSe_2$ $TiO_2$; $MoO_2$; $NbO_2$, $WO_2$ $LiTiS_2$; $LiMo\ S_2$;

$V_2O_5$; $V_2O_3$; $VO_2$; $V_nO_{2n+1}$ wherein n=3, 4, or 6; $V_mO_{2m-1}$ wherein m is 4 to 8; $LiEO_2$ wherein E is Cr, V, Fe, Sc, or Y;

$LiNiVO_4$; or $Li_{(3-x)}F_2(PO_4)_3$ wherein $0 \leq x \leq 3$ wherein F is V, Cr, Mn, Fe, Co, Ni, Cu, Al, Mg, La, Ce, Sr, or V. A combination comprising at least one of the foregoing positive active materials can be used.

In an embodiment the positive active material may comprise:

$LiCoO_2$;

$LiMn_2O_4$;

$LiNi_{1-x}Co_xMyO_2$ wherein M is Al, Ti, Mg, or Zr and $0 < x \leq 1$ and $0 \leq y \leq 0.2$; or $LiNi_xCo_yMn_{1-x-y}O_2$ wherein $0 < x \leq 0.5$ and $0 \leq y \leq 0.5$. A combination comprising at least one of the foregoing positive active materials can be used.

Lithium cobalt oxide, lithium nickel oxide, lithium manganese oxide, lithium nickel cobalt oxide, and lithium nickel manganese oxide are specifically mentioned.

The positive active material may further comprise a coating layer on a surface of the positive active material, or a combination of the coating layer and the positive active material. The coating layer may include a hydroxide, oxyhydroxide, oxycarbonate, or hydroxycarbonate. A combination comprising at least one of the foregoing can be used. The coating layer may be amorphous or crystalline. The coating layer may comprise Mg, Al, Co, K, Na, Ca, Si, Ti, Bi, Pb, V, Sn, Ge, Ga, B, As, Zr, or a combination thereof. The coating layer may be disposed by any process or technique that does not adversely affect the physical properties of the positive active material. Representative methods include spray coating or immersion coating, for example. The positive active may also be combined with an additive, such as a carbon, for example.

Alternatively, the electrode may be a negative electrode, and may comprise a negative electrode material disposed on the composite current collector. The negative electrode material may comprise a negative active material, a binder, and an additive such as a conductive additive. The negative active material may be capable of reversibly intercalating lithium. Representative negative active materials include a carbonaceous material that is capable of reversibly intercalating or deintercalating lithium, lithium metal, silicon, lithium titanate, an alloy of lithium metal, or a material capable of reversibly forming a compound with lithium, such as tin oxide. Representative carbonaceous materials include graphite, e.g. SFG-15 or SFG-44 available from TIMCAL, and meso-carbon micron bead ("MCMB") materials, e.g. MCMB-6-28, MCMB-10-28, and MCMB-25-28 available from Osaka Gas. The negative active material may also comprise Al, Mg, K, Na, Bi, Ca, Sr, Ba, Si, Ge, Sn, Sb, Pb, In, or Zn. A negative electrode comprising a MCMB material, specifically MCMB-6-28 is specifically mentioned. A combination comprising at least one of the foregoing can be used.

Representative binders include polyvinylidene fluoride, a copolymer of polyvinylidene fluoride and hexafluoropropylene, poly(vinyl acetate), poly(vinyl butyral-co-vinyl alcohol-co vinyl acetate), poly(methylmethacrylate-co-ethyl acrylate), polyacrylonitrile, polyvinyl chloride-co-vinyl acetate, polyvinyl alcohol, poly(1-vinylpyrrolidone-co-vinyl acetate), cellulose acetate, polyvinylpyrrolidone, polyacrylate, polymethacrylate, polyolefin, polyurethane, polyvinyl ether, acrylonitrile-butadiene rubber, styrene-butadiene rubber, acrylonitrile-butadiene-styrene, tri-block polymer of sulfonated styrene/ethylene-butylene/styrene, and polyethylene oxide. A combination comprising at least one of the foregoing can be used.

A method of manufacturing an electrode may comprise providing a current collector as described above; and disposing an electrode material on the current collector to manufacture the electrode. The method of manufacturing the electrode may further comprise filling the opening with the electrode material or other material, such as a conductive material.

Figure 12:
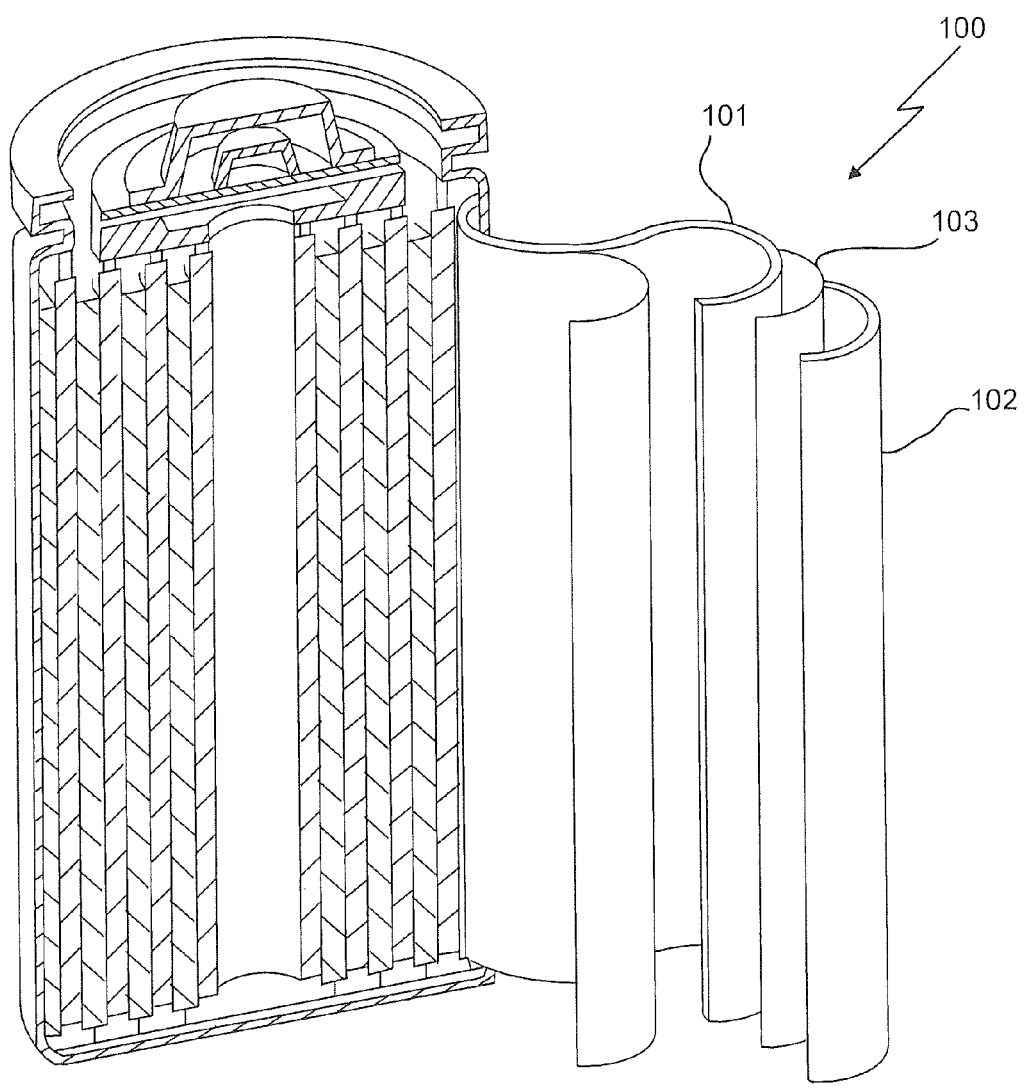
FIG. 12 is a schematic diagram of a lithium-ion battery.

The positive electrode and/or the negative electrode may be used in a rechargeable battery, an embodiment of which is shown in FIG. 12. The rechargeable battery may be a lithium-ion battery, or a lithium polymer battery, for example. As shown in FIG. 12, the rechargeable lithium-ion battery 100 may include a positive electrode 101; a negative electrode 102; a separator 103 interposed between the positive electrode 101 and the negative electrode 102. The separator may be a microporous membrane, and may comprise polypropylene, polyethylene, or a combination thereof.

Also, the battery may comprise an electrolyte which contacts the positive electrode 101, the negative electrode 102, and the separator 103. The electrolyte may comprise an organic solvent and a lithium salt. In an embodiment the electrolyte is a polymer electrolyte.

The organic solvent may be a linear or cyclic carbonate. Representative organic solvents include ethylene carbonate, propylene carbonate, butylene carbonate, trifluoropropylene carbonate, γ-butyrolactone, sulfolane, 1,2-dimethoxyethane, 1,2-diethoxyethane, tetrahydrofuran, 3-methyl-1,3-dioxolane, methylacetate, ethylacetate, methylpropionate, ethylpropionate, dimethyl carbonate, diethyl carbonate, ethyl methyl carbonate, dipropyl carbonate, and methylpropyl carbonate. A combination comprising at least one of the foregoing can be used.

Representative lithium salts include $LiPF_6$, $LiBF_4$, $LiAsF_6$, $LiClO_4$, $LiCF_3SO_3$, $Li(CF_3SO_2)_2N$, $LiN(SO_2C_2F_5)_2$, $LiSbF_6$, $LiN(CF_3SO_2)_3$, $LiC_4F_9SO_3$, and $LiAlCl_4$ The lithium salt may be dissolved in the organic solvent. A combination comprising at least one of the foregoing can be used. The concentration of the lithium salt is can be 0.1 to 2.0M in the electrolyte.

The configuration of the rechargeable lithium-ion battery is not limited and can be cylindrical, as shown in FIG. 12, or prismatic, for example. Modification of the battery to provide an alternative configuration can be determined by one of skill in the art without undue experimentation.

EXAMPLES

Example 1

Composite Current Collector Manufacture

TEFZEL, KAPTON, and MYLAR films were used as received. The TEFZEL and KAPTON each had a thickness of 0.001 inch, and the MYLAR had a thickness of 0.0005 inch.

The TEFZEL and KAPTON films were perforated by a laser to have elliptical holes with the axial dimensions 30 by 100 micrometers (μm) and a hole density of 4 and 25 holes per square centimeter, respectively. The MYLAR film was perforated by a laser to have elliptical holes with the axial dimensions 30 by 100 μm and a hole density of 4 holes per square centimeter.

A 0.3 to 0.4 μm layer of copper was deposited on both sides of each perforated film by vacuum sputtering.

Each film was tested by contacting opposite sides of the film with the electrodes of a FLUKE 73 III Multimeter ohm-meter. For each film the resistance between opposite sides of the film was determined to be less 0.2 ohm, which is the minimum resistance measurable with the FLUKE 73 III Multimeter ohm-meter.

Example 2

Negative Electrode Manufacture

A 30 by 8 cm portion of the perforated and copper clad KAPTON film prepared in Example 1 was coated with an anode active material to prepare a lithium-ion negative electrode. A coating composition was prepared by combining 87 g of MCMB 6-28, 3 g of a carbon black, and 10 g of a PVDF binder dissolved in 100 g of N-methylpyrrolidone to provide a slurry having a viscosity of 6·10$^3$ centipoise (Cp). The coating composition was manually coated on both sides of the perforated KAPTON film of Example 1 and dried on a hot plate at 135 to 140° C. until visually dry, and then further dried in a vacuum over at 110° C. overnight. The negative electrode had an active area of 4.055 square inches, weighed about 120 milligrams, had a coating amount of about 75 milligrams per square inch (mg/in$^2$) on a first side, and had about 110 mg/in$^2$ on an opposite second side. The expected capacity of the first side was 80 mAh, and the expected capacity of the second side was 120 mAh.

Example 4

Lithium-Metal Cell Manufacture

A pouch cell-type nickel foil lead (Pred Materials International, New York, N.Y.) was taped to the 110 mg/in$^2$ side of the negative electrode using 3M Type 8403 MYLAR tape.

A lithium-ion half cell having the dimensions 2.5 by 4.0 inches was manufactured using the MCMB based electrode of Example 2, lithium (anode), and a 20 micrometer polyolefin separator interposed between the positive electrode and the negative electrode. The cell was filled with 0.6 g of an electrolyte comprising 1.0M LiPF$_6$ in ethylene carbonate, dimethyl carbonate, and diethyl carbonate in the ratio 1:1:1 by volume, and then heat sealed.

Figure 13:
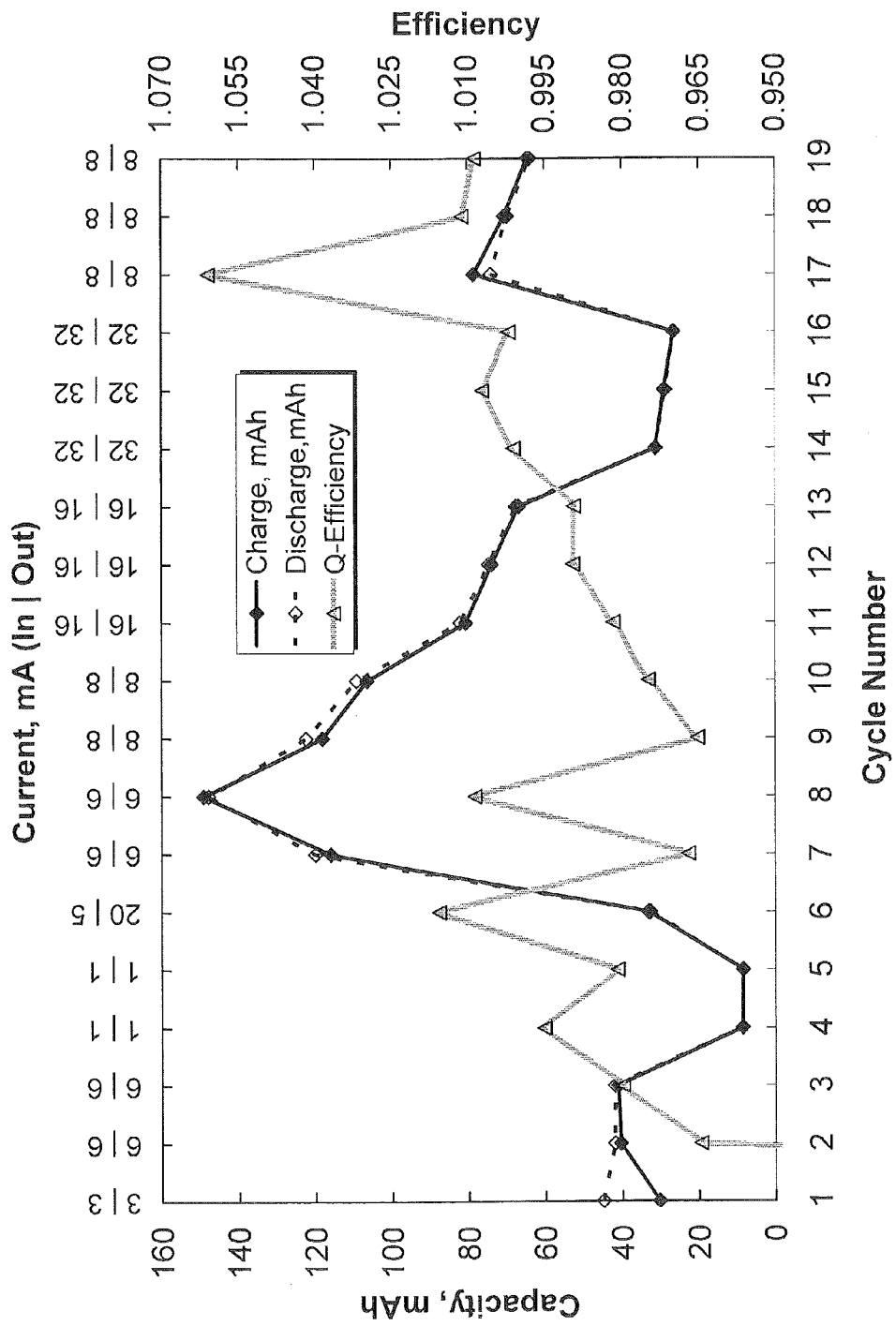
FIG. 13 is a graph of cell voltage (Volts) and current (milliAmperes, mA) versus time (hours, hrs) of the cell of Example 4.
Figure 14:
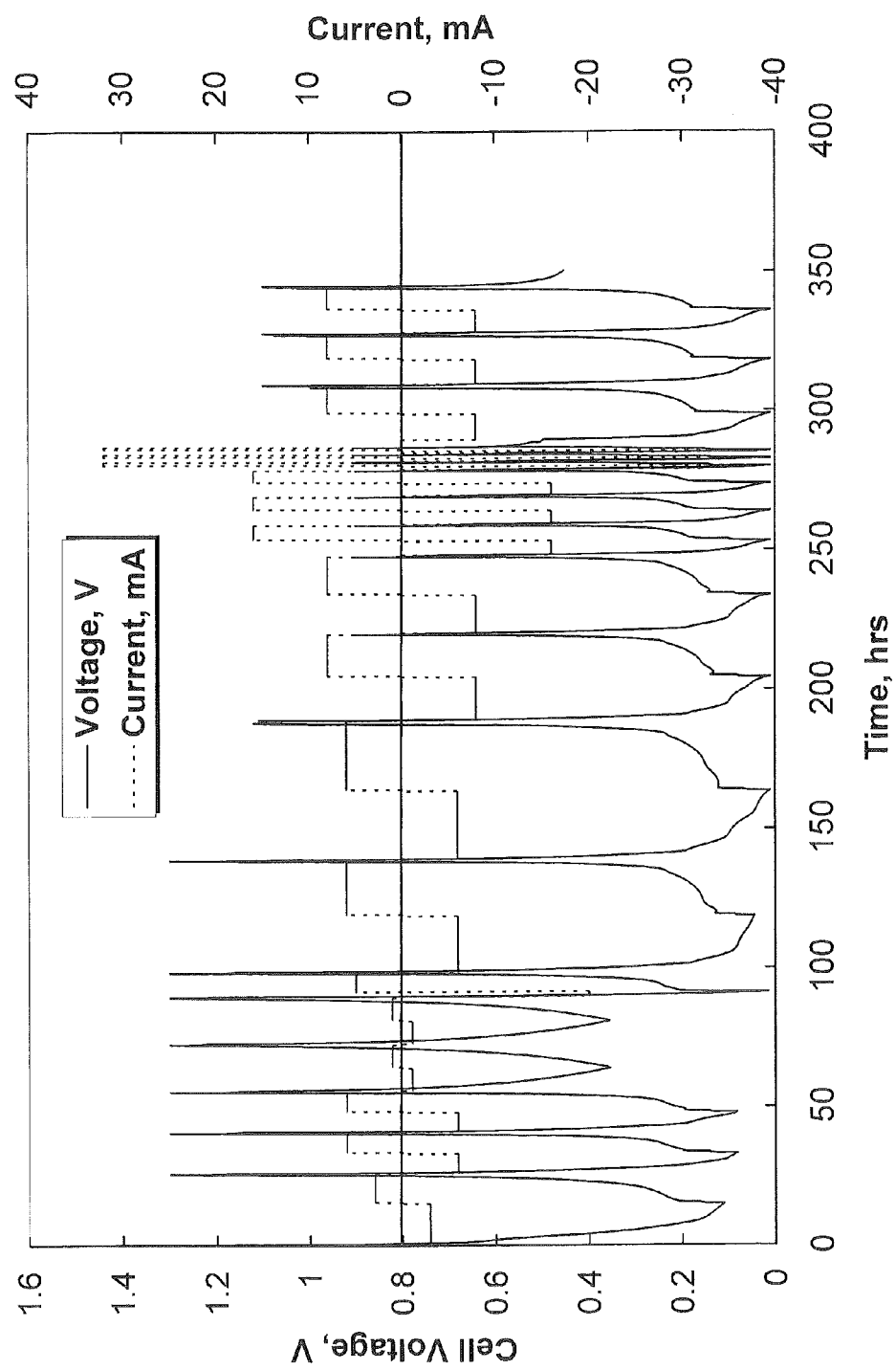
FIG. 14 is graph of capacity (milliAmpere-hours, mAh) and efficiency versus cycle number for the cell of Example 4.

FIG. 13 is a graph of the cell voltage (Volts) and current (milliAmperes, mA) of the cell of Example 4 versus time (hours, hrs). Also, shown in FIG. 14, is graph of capacity (milliAmpere-hours, mAh) and efficiency versus cycle number. Included in FIG. 14 is the current (mA) for each charge and discharge cycle. As shown in FIGS. 13 and 14, the cell delivered a capacity of 150 mAh on the 8$^{th}$ cycle exceeding the capacity of a single side. This result shows that the metal layer on the KAPTON film provided sufficient conductivity to both sides of the negative electrode.

Example 5

Slurry Retention

A KAPTON film was perforated to have elliptical perforations having a length of 300 μm and a width of 50 μm. Using the method of Example 2, the slurry of Example 2 was manually coated on a 30 by 8 cm portion of the perforated and copper clad KAPTON film prepared in Example 1. Surprisingly, the slurry was retained in the elliptical perforations.

Example 6

Perforation Size

Figure 15:
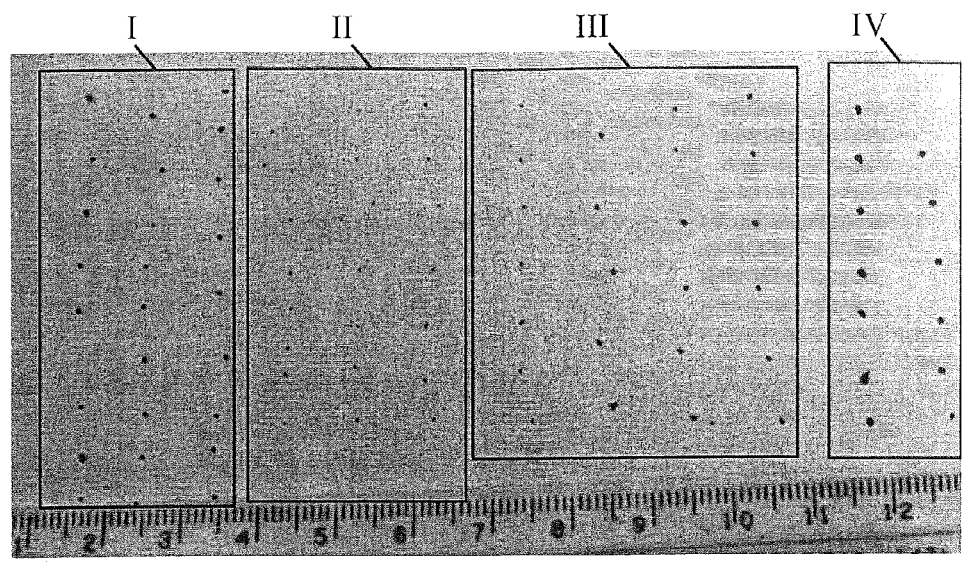
FIG. 15 is a photograph of the perforated copper clad Mylar film of Example 6.

A copper clad Mylar film having a thickness of 0.001" was prepared using the same method disclosed in Example 1. The copper clad Mylar film was perforated with four groups of holes, Groups I to IV, as shown in FIG. 15. Group I had a largest diameter of 300 to 400 μm, Group II had a largest diameter of 250 to 300 μm, Group III had a largest diameter of 500 to 600 μm, and Group IV had a largest diameter of more than 1000 to 1200 μm. The perforated copper clad Mylar film having the perforations of Groups I to IV is shown in FIG. 15.

The perforated copper clad Mylar film having the perforations of Groups I to IV shown in FIG. 15 was then manually coated with the negative electrode coating composition of Example 2 using the method described in Example 2 to provide a coated copper clad Mylar film.

Figure 16:
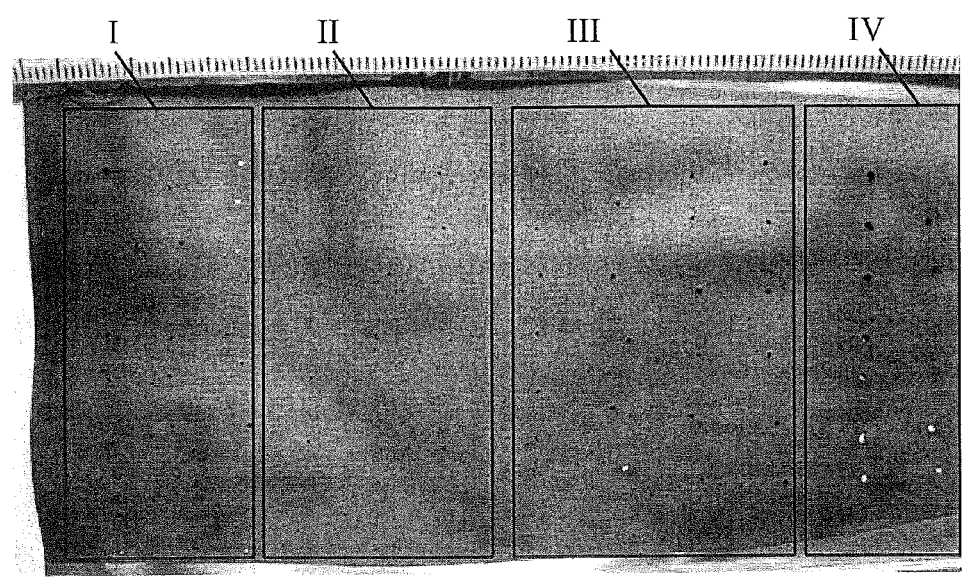
FIG. 16 is a photograph of the coated copper clad Mylar film of Example 13.

The coated copper clad Mylar film is shown in FIG. 16. As shown in FIG. 16, the coating composition was not retained in the perforations of Group III and IV. Also, it was observed that the coating composition seeped through the perforations of Groups III and IV to the opposite side of the copper clad Mylar film and created a non-uniformity on the opposite side, and the perforations of Group II retained the slurry. These results show that use of perorations having a diameter of less than or equal to 300 μm substantially or effectively prevents formation of non-uniformities from the coating composition seeping through the perforations to the opposite side of the film.

While this disclosure describes exemplary embodiments, it will be understood by those skilled in the art that various changes can be made and equivalents can be substituted for elements thereof without departing from the scope of the disclosed embodiments. In addition, many modifications can be made to adapt a particular situation or material to the teachings of this disclosure without departing from the scope thereof. Therefore, it is intended that this disclosure not be limited to the particular embodiments disclosed as the best mode contemplated for carrying out this disclosure. It should also be understood that the embodiments disclosed herein should be considered in a descriptive sense only and not for purposes of limitation. Descriptions of features or aspects of each embodiment should be considered as available for other similar features or aspects of other embodiments.

What is claimed is:
1. A current collector comprising:
    a polymer film comprising a first major surface, an opposite second major surface, and
    a plurality of openings extending through a thickness of the polymer film;
    a first layer on the first major surface of the polymer film;
    a second layer on the second major surface of the polymer film; and
    a third layer on an inner surface of the plurality of openings,
    wherein the third layer contacts the first layer and the second layer, wherein the first layer, the second layer, and the third layer each independently has an electrical conductivity of greater than 10 Siemens per meter, wherein for each of the plurality of openings, the third layer fills 20 to 80% of a total volume of each of the plurality of openings.

2. The current collector of claim 1, wherein a width of the plurality of openings is 0.1 micrometer to 300 micrometers.

3. The current collector of claim 1, wherein a shape of the plurality of openings is circular, square, rectangular, or elliptical.

4. The current collector of claim 2, wherein a length of the plurality of openings is 0.2 micrometer to 10,000 micrometers.

5. The current collector of claim 4, wherein a ratio of the length to the width is 1000:1 to 1:1.

6. The current collector of claim 1, wherein a first distance in a first direction between a first opening of the plurality of openings and an adjacent second opening of the plurality of openings is 0.01 to 50 millimeters.

7. The current collector of claim 6, wherein a second distance between the first opening and an adjacent third opening of the plurality of openings is 0.01 to 50 millimeters, wherein the second distance is in a second direction and the second direction is perpendicular to the first direction.

8. The current collector of claim 1, wherein the first layer has a first thickness taken perpendicular to the first major surface, the second layer has a second thickness taken perpendicular to the second major surface, and the third layer has a third thickness taken perpendicular to the openings, and wherein the first thickness, the second thickness, and the third thickness are each independently 0.01 micrometer to 25 micrometers.

9. The current collector of claim 1, wherein the first layer is in electrical communication with the second layer.

10. The current collector of claim 1, wherein the third layer is on an entire surface of an opening of the plurality of openings.

11. The current collector of claim 10, wherein the third layer occludes the opening.

12. The current collector of claim 11, wherein the third layer fully fills the opening and the first layer, the second layer, and the third layer comprise a same metal.

13. The current collector of claim 12, wherein the third layer electrically connects the first layer and the second layer.

14. The current collector of claim 1, wherein the polymer comprises a polyacetal, polyolefin, polyacrylic, polycarbonate, polystyrene, polyester, polyamide, polyamideimide, polyarylate, polyarylsulfone, polyethersulfone, polyphenylene sulfide, polyvinyl chloride, polysulfone, polyimide, polyetherimide, polytetrafluoroethylene, polyetherketone, polyether etherketone, polyether ketone ketone, polybenzoxazole, polyphthalide, polyacetal, polyanhydride, polyvinyl ether, polyvinyl thioether, polyvinyl alcohol, polyvinyl ketone, polyvinyl halide, polyvinyl nitrile, polyvinyl ester, polysulfonate, polysulfide, polythioester, polysulfone, polysulfonamide, polyurea, polyethylene terephthalate, or a combination comprising at least one of the foregoing.

15. The current collector of claim 14, wherein the polymer is poly(ethylene-co-tetrafluoroethylene), polyethylene terephthalate, or poly(4,4'-oxydiphenyl ene-pyromellitimide).

16. The current collector of claim 1, wherein the first layer, the second layer, and the third layer each independently comprise an element of Groups 3 to 15 of the Periodic Table of the Elements.

17. The current collector of claim 1, wherein the first layer, the second layer, and the third layer each independently comprise a metal of Groups 3 to 15 of the Periodic Table of the Elements.

18. The current collector of claim 17, wherein the first layer, the second layer, and the third layer are copper or an alloy thereof.

19. The current collector of claim 17, wherein the first layer, the second layer, and the third layer are aluminum or an alloy thereof.

20. The current collector claim 1, further comprising an interlayer interposed between the polymer film and the first layer, the second layer, or the third layer.

21. The current collector of claim 1, further comprising a first portion and a second portion, wherein the plurality of openings are disposed in the first portion and not disposed in the second portion.

22. An electrode comprising:
the current collector of claim 1; and
further comprising an electrode material on at least one of the first layer, the second layer, or the third layer of the current collector.

23. The electrode of claim 22, wherein the electrode material is disposed on the third layer.

24. The electrode of claim 23, wherein the electrode material fills a through-hole defined by the third layer.

25. A battery comprising the electrode of claim 22, wherein the battery is a lithium-ion battery or a lithium polymer battery.

26. A method of manufacturing a current collector, the method comprising:
providing a polymer film comprising a first major surface and an opposite second major surface;
perforating the polymer film to provide a perforated polymer film having a plurality of openings extending through a thickness of the polymer film;
disposing a first layer on the first major surface of the polymer film;
disposing a second layer on the second major surface of the polymer film; and
disposing a third layer on an inner surface of the plurality of openings,
wherein the third layer contacts the first layer and the second layer,
wherein the first layer, the second layer, and the third layer each independently has an electrical conductivity of greater than 10 Siemens per meter, and
wherein for each of the plurality of openings, the third layer fills 20 to 80% of a total volume of each of the plurality of openings.

27. The method of claim 26, wherein disposing the first layer, disposing the second layer, and disposing the third layer are performed after perforating the polymer film.

28. The method of claim 26, wherein disposing the first layer, disposing the second layer, and disposing the third layer are performed at a same time.

29. The method of claim 26, further comprising filling the plurality of openings with the third layer.

30. A method of manufacturing an electrode, the method comprising:
providing a current collector according to claim 1; and
disposing an electrode material on the current collector to manufacture the electrode.

31. The method of claim 30, further comprising filling the plurality of openings with the electrode material.

32. The current collector of claim 17, wherein the first layer, the second layer, and the third layer each independently comprise Ni, Ti, or a combination thereof.

33. The current collector of claim 32, wherein the first layer, the second layer, and the third layer consist of Ni or Ti.

34. The current collector of claim 32, wherein the first layer, the second layer, and the third layer have an electrical conductivity of 1000 to $5 \times 10^7$ Siemens per meter.

35. The current collector of claim 34, wherein the first layer, the second layer, and the third layer consist of Ni.

36. The current collector of claim 1, wherein an average largest diameter of the plurality of openings is 0.1 micrometer to 10,000 micrometers.

37. The current collection of claim 1, wherein the first layer comprises a first conductor, the second layer comprises a second conductor, and the third layer comprises a third conductor, wherein the third conductor is different from the first conductor or the second conductor.

\* \* \* \* \*